United States Patent [19]

Wheeler

[11] 4,073,241

[45] Feb. 14, 1978

[54] BOTTLE SUPPORTED SHELF APPARATUS

[76] Inventor: Richard J. Wheeler, 17 Ferguson Road, Warren, N.J. 07060

[21] Appl. No.: 709,838

[22] Filed: July 29, 1976

[51] Int. Cl.² .............................................. A47B 57/00
[52] U.S. Cl. ..................................... 108/91; 108/111; 108/156; 52/DIG. 9
[58] Field of Search ......................... 108/156, 91, 111; 52/DIG. 9; D6/151, 195; 85/70, 71, 85

[56] References Cited

U.S. PATENT DOCUMENTS

| | | | |
|---|---|---|---|
| 1,938,919 | 12/1933 | Marsh | 206/821 X |
| 2,125,018 | 7/1938 | Hamill | 85/70 |
| 2,150,866 | 3/1939 | Sipe | 85/70 |
| 2,904,379 | 9/1959 | Nelson | 108/156 X |
| 3,651,651 | 3/1972 | Triplett | 85/70 X |
| 3,783,801 | 1/1974 | Engman | 108/60 |
| 3,884,521 | 5/1975 | Moore | 52/DIG. 9 |

FOREIGN PATENT DOCUMENTS

| | | | |
|---|---|---|---|
| 898,965 | 6/1962 | United Kingdom | 85/70 |

OTHER PUBLICATIONS

W. N. De Sherbinin Products 1953 Catalog Form No. 112151 pp. 3-4, 5.

Primary Examiner—Roy D. Frazier
Assistant Examiner—Peter A. Aschenbrenner
Attorney, Agent, or Firm—Richard C. Woodbridge

[57] ABSTRACT

A shelf apparatus includes at least one horizontal shelf and a plurality of hollow support means connected to said shelf by a compressible, expansible attaching means. According to the preferred embodiment the support means comprise bottles and the attaching means comprises a rubber-like plug which in its non-expanded state fits easily into the neck of the bottle. The plug is connected to the shelf by a bolt which passes through a hole in the shelf and also passes through a hole in the plug. An anchoring device such as a nut and washer combination is connected to the bolt just below the plug member. Rotation of the bolt causes the anchor device to pull up against the base of the rubber plug thereby causing it to expand against the inside of the neck of the bottle. The expanded rubber plug firmly connects the bottle support to the shelf above it. A variety of different devices can be constructed in this manner including ornamental shelving arrangements, bookcases, coffee tables, and like items.

14 Claims, 11 Drawing Figures

BOTTLE SUPPORTED SHELF APPARATUS

BACKGROUND OF THE INVENTION

1. Field of the Invention

This invention relates to a shelf apparatus wherein the vertical supports are connected to the horizontal shelf members by means of an expansible, compressible plug.

2. Description of the Prior Art

Shelving devices made from every day articles are known to those of ordinary skill in the art. For example, cinder blocks and bricks are frequently used as a very rudimentary support between flat boards which serve as a horizontal shelf. Such construction is sometimes found on modern college and university campuses. Occasionally other everyday items are used too. The May, 1976 edition of GLAMOUR Magazine discloses a glass-topped table and a beer bar in which the vertical supports comprise a plurality of stacked beer cans all firmly connected together with a General Electric clear silicone caulk and seal. While the approaches just described are quite inexpensive, they are frequently unstable due to the fact that the vertical support is not firmly attached to the horizontal shelving unit. In addition, everyday items such as beer cans, bricks and cinder blocks may vary in height, thereby causing the shelving unit to incline away from the true horizontal position.

There are devices known for firmly attaching a vertical support to a horizontal shelf member. Engman, U.S. Pat. No. 3,783,801 discloses an "Article of Furniture" in which molded, polymeric inserts are employed as an attaching means between the vertical supports and the horizontal shelves. The inserts described therein appear to be relatively rigid and therefore not compressible or expansible. Accordingly, such at attachment can only accomodate vertical supports having a predetermined interior dimension. The Engman device does not appear to disclose a universal type of insert or adapter which will accomodate irregular or tapered vertical supports. Even if the supports in the Engman invention were designed with flexibility, it is doubtful if there other structural characteristics would allow them to be used for the purposes of the present invention. Laconte, U.S. Pat. No. 1,431,823 discloses a "Demountable Article of Furniture with Multiple Combinations" having a structure similar to that disclosed in U.S. Pat. No. 3,783,801. Of similar interest also are Mitchell, U.S. Pat. No. 3,021,187 and Herrschaft, U.S. Pat. No. 3,197,822.

It is known to those of ordinary skill in the art that bottles and glass objects exhibit good mechanical strength against vertical loads. For example, it is well known that cases of bottles can be stacked to a relatively great height without significant injury to the bottles themselves. Patterson, U.S. Pat. No. 2,908,395 and Barrnieau, U.S. Pat. No. 3,677,203 disclose devices which take advantage of the vertical stacking strength of glass bottles. While the stacking strength of bottles has been recognized by those of ordinary skill in the art, there use as a support for shelving has been severely limited by the lack of a suitable method for attaching the bottle to the shelving itself. Accordingly, glass or glass bottle supported bookcases are not commonly known in the prior art.

Glass bottles have also been used for decorative support purposes in conjunction with electric lights and lamps. A light manufactured by Cable Electric Products, Inc. of Providence, R.I. 02907 is now available on the market which permits an electric light fixture to be attached to a glass bottle which serves as its base. The fixture is held in the mouth of the bottle by a molded, vertically finned cylinder which acts in a manner similar to a cork.

SUMMARY OF THE INVENTION

Briefly described the invention comprises a shelf apparatus including horizontal shelving members and vertical bottle support members. The bottles are connected to the shelf members by an expansible plug which fits into the neck of the bottle. According to the preferred embodiment a bolt passes through the shelf and through a hole in the plug and is terminated by an anchor means comprising a washer and a nut combination. The anchor means may be constructed with a gripping portion so as to bite into the plug and achieve a purchase thereon. The plug is made of an expansible, compressible material such as rubber. Rotation of the bolt by means of a screw driver or similar instrument causes the anchor to press up against the bottom of the plug. The top of the plug is typically restrained from moving by the bottom side of the shelf. As the anchor moves upward the plug begins to expand sidewise against the interior walls of the cavity of the bottle. Sufficient rotation of the bolt will cause the compressible, expansible plug to jam fit inside the neck of the bottle. In this manner the shelf is securely attached to the bottle.

Several different types of expansible, compressible plugs can be used to secure the bottle support to the shelving. According to one embodiment of the present invention a solid rubber-like plug is employed. A similar structure can be formed by spirally winding a piece of compressible rubber-like material into a cylinder. In this manner plugs can be selectively formed to have any given diameter so as to more precisely fit bottles with necks having irregular or varying dimensions. The same effect can be achieved by using a plurality of concentric cylindrical sleeves. Sleeves would be added to the plug until the diameter of the unexpanded plug were just slightly smaller than the interior diameter of the bottle neck.

The preferred embodiment of the invention comprehends a shelving unit having multiple shelves and multiple tiers of vertical bottle supports. The construction of the finished unit is quite flexible since bottles can be connected to the shelving at almost any given desired location. Accordingly, many different random designs can be achieved. Such an apparatus is especially adapted for use as a bookcase or as an ornamental shelf. In its simplest embodiment the invention comprehends a coffee table-like structure having just one shelf and four bottle supports connected thereto which act like leg members.

These and other features of the present invention will be more fully understood with reference to the following drawings and detailed description of the invention.

DETAILED DESCRIPTION OF THE INVENTION

During the course of this description like members will be used to identify like elements according to the different figures illustrating the invention.

Figure 1:
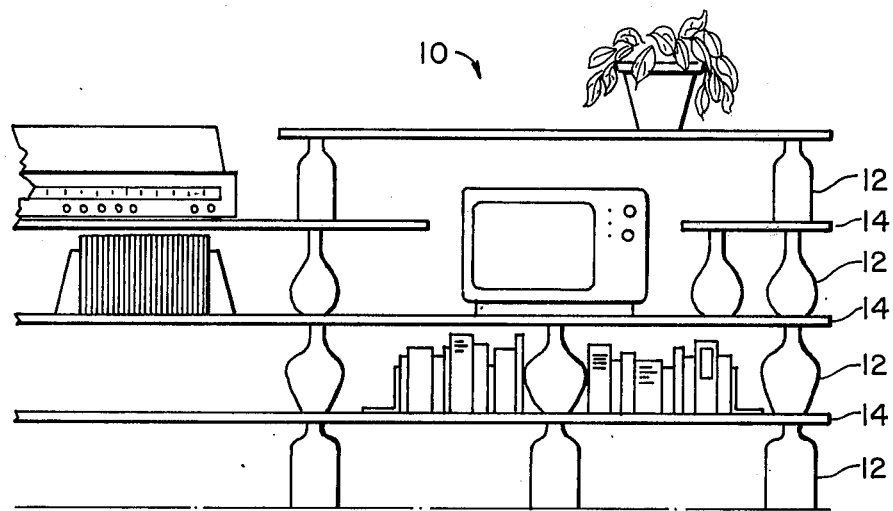
FIG. 1 illustrates a shelving apparatus constructed according to the preferred embodiment of the present invention.
Figure 3:
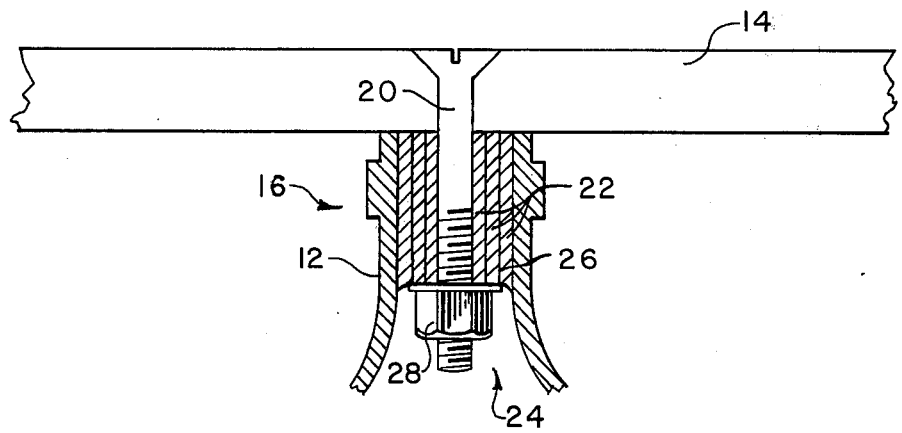
FIG. 3 is a detailed cross-sectional view of the means for attaching a shelving unit to a vertical bottle support.

A shelf apparatus 10 according to the preferred embodiment of the present invention is illustrated in FIG. 1. The apparatus comprises a plurality of vertical bottle supports 12 and a plurality of horizontal shelf members 14 connected together with an attaching means 16 such as illustrated in FIG. 3. The shelf apparatus 10 disclosed in FIG. 1 is only one of a wide variety of different arrangements that can be made according to the preferred embodiment of the present invention. It should be noted, for example, that different sizes and shapes of bottles 12 can be used as the vertical supports and those bottles 12 can be located at a variety of different necessary locations. In order to conserve space the bottles are typically located at those positions where they must bear some weight. A large number of different types of items can be stored on the shelf apparatus 10. For example, books, records, plants, vases, radios, televisions, etc. can all be placed on the shelf apparatus. The invention is very flexible in that different arrangements can be made to easily accomodate articles of different dimensions and weight. Accordingly, various different artistic and utilitarian combinations are possible. Items such as bookcases, storage shelves and ornamental shelving arrangements are within the spirit and scope of the disclosed invention.

Figure 2:
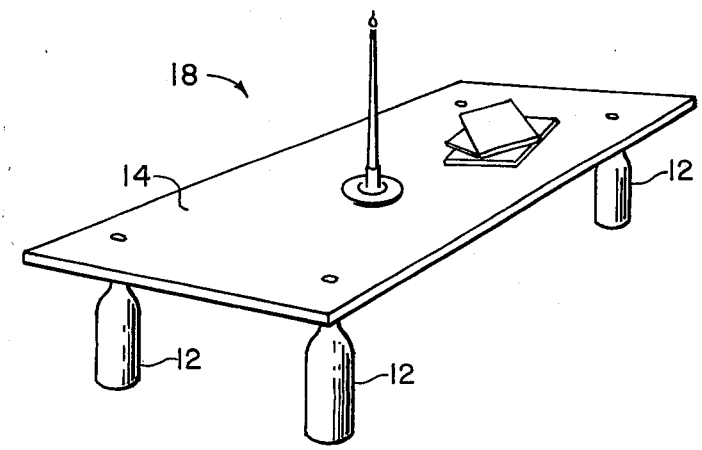
FIG. 2 illustrates a coffee table constructed according to the teachings of the present invention.

An embodiment of the present invention according to a simpler manifestation thereof is illustrated by the coffee table 18 in FIG. 2. The coffee table 18 merely comprises one shelf means 14 and four bottle supports 12. Three bottles could be used to support a planar surface such as this but four bottles are preferred due to the improved stability that it lends to the table. The coffee table 18 is just one of many different devices that can be made according to the teaching of the present invention.

An attaching means 16 is shown in cross-sectional detail in FIG. 3. The attaching means 16 essentially comprises a threaded rod or bolt 20, an expansible, compressible plug means 22 and an anchor means 24. According to the preferred embodiment of the present invention the anchor means 24 comprises a washer 26 and a bearing surface locking nut 28. The plug 22 is preferably made from a coiled strip of compressible, expansible material such as will be described in more detail with reference to FIG. 4b and 4c. The coiled strip comprising plug 22 was approximately 1½ inches wide × 1/16 inch thick. The material measured approximately 60 durometers in hardness. The threaded rod 20 preferably comprised a flat headed steel machine screw one-quarter inch nominal diameter, 20 threads per inch (¼ - 20). The washer 26 included a ¼ inch internal hole to accomodate the machine screw 20. The washer is preferably made of steel. A ¼ - 20 nut with a flange on one surface comprised the locking nut 28. The flange included a plurality of small teeth which served to frictionally and mechanically grip the underside of washer 26.

A coiled-type plug 22 is preferred because it can accomodate a wide variety of bottle mouth sizes which exist in the marketplace. In relatively small quantities it is less expensive to manufacture the spiral type of plug than it is to manufacture other embodiments.

The compressibility and the subsequent expandibility of the plug 22 is important. If the material is too soft, the final rigidity of the assembled shelving apparatus will be considerably lessened. If the material is too hard, it will be difficult to compress and therefore difficult to obtain an adequate purchase upon the interior of the bottle neck. One of the most important features of the present invention is that it can accomodate bottles wherein the interior of the neck portion has irregular dimensions. In this respect the present invention has an advantage over prior art devices such as illustrated in U.S. Pat. No. 3,783,801 in that the flexing of the present invention allows it to be used with a large number of bottles having different interior dimensions.

Figure 4A:
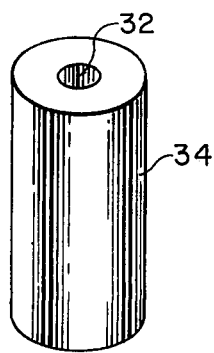
FIG. 4a is a perspective view of a solid compressible, expansible plug.
Figure 4B:
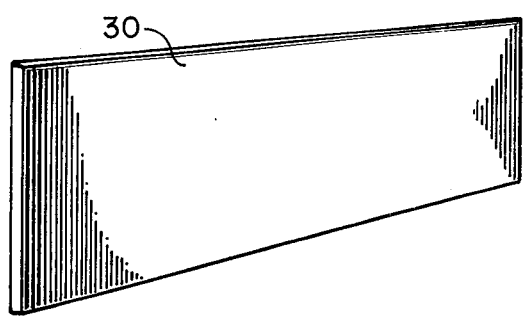
FIG. 4b is a perspective view of the expansible, compressible material employed in making the plug illustrated in FIG. 4c.
Figure 4C:
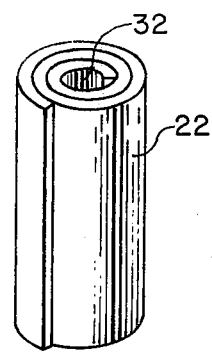
FIG. 4c is a perspective view of an expansible, compressible plug made up of a coiled or spirally wound piece of expansible, compressible material.

FIG. 4c illustrates in perspective detail the plug 22 seen in the cross-section of FIG. 3. The coiled plug 22 is formed by coiling a piece of material 30 into a roll, leaving an aperture 32 at the center thereof. The diameter of the aperture 32 should be just slightly larger than the outside diameter of the threaded compressing rod 20. In a similar manner the outside diameter of the coiled plug 22 should be just slightly smaller than the inside diameter of the neck of the support bottle 12. Under certain circumstances it may be desirable to use adhesives or adhesive tape in order to keep the coiled material from unwinding. A strip of expansible, compressible material 30 of the sort used to form a coiled plug 22 is illustrated in its flattened state in FIG. 4b.

A relatively simple plug assembly 34 is illustrated in FIG. 4a. According to FIG. 4a the plug 34 comprises a solid rubber-like mass having an aperture 32 passing therethrough in the same manner as described with reference to plug 22 of FIG. 4c. If the bottles all have the same interior neck dimensions, then a plug such as 34 may be quite desirable. Plug 34 has the disadvantage, however, that it can be used only for bottles having interior dimensions within a small range. The advantage of a coiled plug 22 is that the outside diameter of the plug can be made to any effective dimension in order to accomodate the varying dimensions of bottle neck sizes on the market. Accordingly, plug 34 is more limited in utility than plug 22.

Figure 4D:
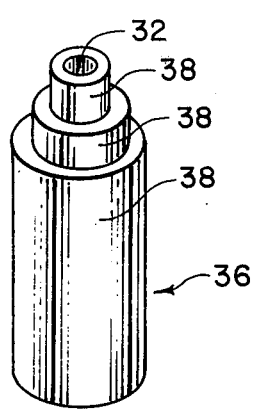
FIG. 4d is a perspective view of an expansible, compressible plug formed by a plurality of concentric sleeves made up of an expansible, compressible material.

A plug 36 which is formed from a plurality of expansible, compressible sleeves 38 is shown in perspective detail in FIG. 4d. In a manner similar to that illustrated in FIGS. 4a and 4c, the plug 36 includes an aperture 32 therethrough which is slightly larger in diameter than the outside diameter of compressing rod 20. By stripping away or adding sleeves 38 it is possible to construct a plug whose outside diameter is just slightly smaller than the inside diameter of the neck of the support bottle 12. The concentric plug 36 is intermediate in flexibility between the solid plug 34 and the coiled plug 22. The coiled plug 22 is infinitely adjustable in that the effective outside diameter can be varied at will. The outside diameter of the concentric sleeve plug 36 can be varied in discrete small steps but is not infinitely adjustable. At the other end of the spectrum the solid plug 34 is not infinitely adjustable, but its diameter could be changed on a lathe or by grinding. As previously described, the compressible expansible strip 30 comprises a material approximately 1½ inches wide ×1/16 inch thick and as long as necessary to achieve the desired diameter. Typically the length varies from 7 inches to 14 inches. The material used measured 60 ± 5 durometers in hardness. Clearly other materials can be used as well. Corrugated cardboard has been employed as a plug. Indoor/outdoor carpet tile material having a dual surface (such as rubber/felt) may be used under some circumstances. Almost any material that is compressible and loses some of its flexibility when compressed is useful. Materials that fall in that category include many plastics such as styrofoam and the like. The dimensions of the strip material can also be varied. A strip having a width of 1 inch has been employed for some applications with satisfactory results.

Also as previously described, the compressing threaded rod 20 comprises a flat headed steel machine screw ¼ - 20. Other types of conventional hardware could be used to achieve the same purpose. For that matter, the material used for the washer 26 and locking nut 28 can be taken from common, everyday hardware stock. While steel has been disclosed as being the preferred material for elements 20, 26 and 28, it will be clear to those of ordinary skill in the art that any material which approximately duplicates the performance of steel should be utilizable too. Such materials include, but are not limited to, brass, aluminum, many plastics, etc.

Figure 5A:
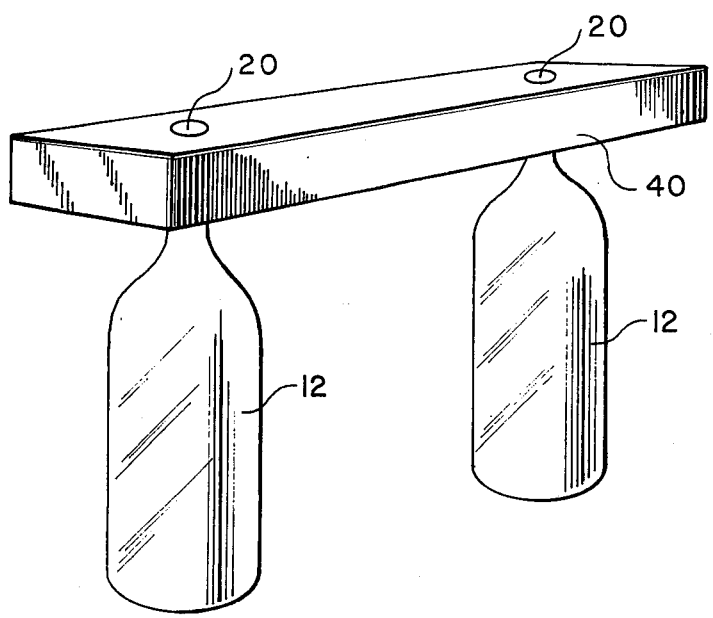
FIG. 5a is a perspective view of an intermediate member used to assist in the joining of the shelving unit to the vertical bottle support.

Under some circumstances it may be desirable to place an intermediate member between the vertical bottle support 12 and the shelf 14. For example when no visible connection is to appear on upperside of the shelving. Such an intermediate member 40 is illustrated in perspective view according to FIG. 5a. The intermediate member 40 helps to stabilize the construction of the shelf apparatus 10 and may make the construction more efficient by breaking the process down into smaller easier to perform steps. In the preferred embodiment the compressing rod 20 passes through the intermediate member 40 and passes through the plug 22 and terminates in the anchor means 24 inside the neck of the bottle 12. Except for the fact that the rod 20 passes through the intermediate member the construction is otherwise similar to that previously described with reference to the shelf apparatus 10. Once the intermediate member 40 is attached to the bottle 12 through the medium of the expansible, compressible plug 22, then the intermediate member 40 can be connected directly to the shelving 14 in a conventional manner. For example, wood screws could be driven through the intermediate member 40 and into the shelf means 14 in the standard manner that wood members are typically joined to each other. FIG. 5d is a side view of a portion of a shelf apparatus 10 wherein the vertical bottle supports 12 are connected to the shelf means 14 through the intermediary of intermediate member 40. According to the preferred embodiment of the invention the intermediate member 40 would comprise a material such as wood but obviously certain plastic materials or the like may be suitable too.

Figures 5B, 5C:
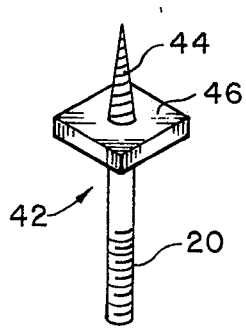
FIG. 5b is a perspective view of a wood screw mount.
FIG. 5c is a perspective view of a flange mount.
Figure 5D:
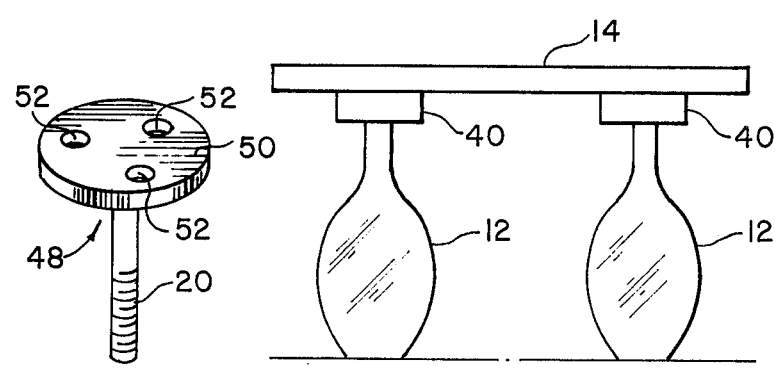
FIG. 5d is a side view of the intermediate member such as illustrated in FIG. 5a and its associated shelving unit showing the manner in which two intermediate members can be used to support the shelving unit.

FIGS. 5b and 5c illustrate alternative methods by which the threaded compressing rod means 20 may be attached to the intermediate member 40 or directly to the shelf means 14. For example, FIG. 5b illustrates a wood screw mount 42 which serves to attach the threaded rod means 20 to either the intermediate member 40 or directly to the shelf means 14. The wood screw mount 42 includes a wood screw tip 44 and a relatively flat planar stopping surface 46 located between the wood screw 44 and the threaded rod 20. The wood screw mount 42 is attached to the intermediate member 40 or to the shelf means 14 by screwing the wood screw tip 44 into the material of the intermediate member or the shelf means 14. The depth of penetration of the wood screw tip 44 is controlled by the planar surface 46 which prevents the wood screw 44 from going too deeply into its anchoring material. Once the wood screw mount 42 has been screwed into a shelf means 14 or an intermediate member 40, then a plug 22 is inserted over threaded rod 20 and secured thereon by an anchor means 24 such as the washer 26 and locking nut 28 combination illustrated in FIG. 3. A bottle is then placed over the plug 22. The outside diameter of the plug 22 must be just slightly smaller than the inside diameter of the interior of the neck of supporting bottle 12. The bottle 12 can then be secured to the wood screw mount 42 by rotating the bottle in such a fashion as to maintain some contact with the plug 22. The rotational movement of the bottle 12 is transmitted to the plug 22 and through the plug 22 to the washer 26 and the locking nut 28. Therefore rotation of the bottle 12 causes the nut 28 to rotate and bear up against the base of the plug member 22. Continued rotation of the bottle 12 draws the anchor means 24 further up against the plug 22 causing plug 22 to compress and expand against the interior walls in the neck of the bottle 12. Eventually a point is reached whereby the bottle 12 is securely connected to either the intermediate member 40 or a shelf means 14.

A flange mount similar in some respects to the wood screw mount 42 is illustrated in a perspective elevation in FIG. 5c. The flange mount 48 includes a flat planar surface 50 including a plurality of attaching holes 52. The flange mount 48 may be attached to an intermediate member 40 or to a shelf means 14 by placing the planar surface 50 against the intermediate member 40 and then driving a plurality of screw or screw-like means through the apertures 52. The flange mount 48 is connected to a vertical support bottle 12 in the same manner as the wood screw mount 42 is connected to its vertical support bottle. That is to say, a plug 22 is placed over the rod 20 and then secured thereto with an anchor means 24 preferably comprising a washer 26 and a locking nut 28. The bottle 12 is then placed over the plug 22 and rotated. The rotation of the bottle is transmitted through the plug 22 to the anchor means 28 which will ride up on the threads of the rod 20. The upward movement of the anchor means 24 causes the plug 22 to compress and expand against the interior walls of the neck of the bottle 12 thereby increasing the frictional contact between the plug 22 and the bottle 12. Rotation of the bottle 12 is stopped once the bottle 12 is firmly attached to the flange mount 48.

From the foregoing it is clear to those of ordinary skill in the art that the attachment of the bottle 12 to the attaching means 16 can be achieved either by rotating the threaded rod 20 as for example, by means of a screw driver applied to a slot in the top thereof, or by rotating the bottle 12, or both. The important fact that must be observed is that there should be relative rotation between the threaded rod 20 and the bottle 12 in order to cause the anchor means 24 to travel upwardly against the bottom of expansible, compressible, plug 22. Other means may be available to cause the anchor 24 to compress the plug 22 However, it has been found that rotation of the compressing rod means 20 or the vertical bottle support 12 is the easiest approach.

According to the preferred embodiment the threaded rod has right-handed threads. Therefore, when the attaching means 16 is inserted into the bottle 12 the nut must be rotated clockwise in order to bring pressure to bear upon the plug 22. As previously described this pressure can be brought to bear either by turning the threaded rod 20 or by turning the bottle 12 thereby causing the plug 22, washer 26 and nut 28 to turn in unison.

The present invention can be modified to accomodate bottles of different heights by placing an appropriate shim between undersized bottles and the shelf means. In particular one or more washer-like shims having holes therethrough larger than the ¼ inch bolt can be employed to make the effective height of a small bottle greater. The washer or washers sit between the bottle/plug combination and the shelf means with the ¼ inch bolt passing through the holes therein. The more washer shims used the greater the heights compensation available.

It will be clear to those of ordinary skill in the art that certain modifications or changes in the invention may be made without departing from the spirit and scope thereof. For example, the washer 26 may be optional if an anchor means 24 can be provided which will spread the force of the upwardly travelling anchor evenly across the base of the plug 22. Accordingly, the nut washer assembly 26 and 28 could comprise one solid unit. Alternatively, the anchor means 24 could be molded as an integral part of the expansible compressible plug 22. In other words, the anchor 24 could be molded into the structure of the plug 22 itself. In another embodiment the anchor means 24 could be intimately associated with the bottom of the plug 22 through other types of friction devices. Alternative anchor means would probably be within the skill of one having knowledge of the art.

As previously described, the attaching means 16 can be connected to the bottle 12 either by rotating an externally rotatable threaded rod 20 or by rigidly holding the rod 20 against a surface and rotating the bottle 12 thereby transmitting the rotational force through the plug 22 and washer 26 to nut 28. Other methods might be employed to bring the anchor means 24 up against the face of the expansible compressible plug 22.

The preferred embodiment of the present invention is illustrated in FIG. 1 as a shelf assembly 10. An alternative embodiment of the present invention is illustrated in FIG. 2 as a coffee table 18. Other types of embodiments would be obvious to one of ordinary skill in the art given the teaching of this invention. For example, stools, bookcases, benches, and even chairs and the like could be constructed according to the teachings of this disclosure. In its broadest application the invention may also be used to support some non planar objects such as lamp fixtures and the like.

While the present invention has been described with reference to a preferred embodiment thereof it would be within the ability of one of ordinary skill in the art to make certain modifications and changes to the basic invention without departing from the spirit and scope thereof.

I claim:

1. A shelf apparatus comprising:
   shelf means;
   support means comprising at least three bottle means, said bottle means having internal walls which define a cavity having a substantially continuous circular cross-section; and,
   attaching means for connecting said shelf means to said bottle means, said attaching means including:
   a compressing means attached to said shelf means; and,
   an expansible, compressible means having a substantially cylindrical shape in its non-compressed state, said expansible, compressible means being connected to said compressing means and adapted to expand against the walls of said bottle means in response to actuation of said compressing means.

2. The apparatus of claim 1 wherein said expansible, compressible means is resilient.

3. The apparatus of claim 2 wherein said expansible, compressible means comprises a rubber-like plug having a hole therethrough for receiving said compressing means.

4. The apparatus of clam 3 wherein said shelf means includes at least one hole therethrough; and,
   said compressing means includes a threaded rod-like means.

5. The apparatus of claim 4 further comprising:
   a threaded anchor means attached to one end of said threaded rod-like means and adapted to compress said compressible, expansible means in response to rotation of said threaded rod-like means.

6. The apparatus of claim 5 wherein said compressible, expansible means is formed from a spirally wound piece of compressible, expansible material.

7. The apparatus of claim 5 wherein said compressible, expansible means comprises a plurality of concentric sleeves of compressible, expansible material.

8. The apparatus of claim 5 wherein said compressing means comprises a threaded bolt means.

9. The apparatus of claim 8 wherein said anchor means comprises a washer having a hole therethrough for receiving said threaded bolt means and a nut means connected to said threaded bolt means for urging said washer against said expansible, compressible means.

10. The apparatus of claim 2 wherein said shelf means comprises a plurality of shelves and said shelf apparatus comprises a bookcase-like apparatus.

11. The apparatus of claim 2 wherein said shelf means comprises one shelf and said shelf apparatus comprises a table.

12. A shelf apparatus comprising:
    shelf means;
    intermediate means attached to said shelf means;
    support means comprising at least three bottle means, said bottle means having internal walls which define a cavity having a substantially continuous circular crosssection; and, attaching means for connecting said intermediate means to said bottle means, said attaching means including:

a compressing means attached to said intermediate means; and, an expansible, compressible means having a substantially cylindrical shape in its noncompressed state, said expansible, compressible means being connected to said compressing means and adapted to expand against the internal walls of said bottle means in response to actuation of said compressing means.

13. The apparatus of claim 12 wherein said expansible, compressible means is resilient.

14. An attaching apparatus for connecting a shelf means to a support means comprising at least three bottle means, each bottle means having internal walls which define a cavity having a substantially continuous circular cross-section, said attaching apparatus comprising:

a compressing means attached to said shelf means; and, an expansible, compressible means having a substantially cylindrical shape in its noncompressed state, said expansible, compressible means being connected to said compressing means and adapted to expand against the internal walls of said bottle means in response to the actuation of said compressing means.

* * * * *